US010662050B2

(12) United States Patent
Anderson et al.

(10) Patent No.: US 10,662,050 B2
(45) Date of Patent: May 26, 2020

(54) APPARATUS AND METHOD FOR FILLING A CONTAINER

(71) Applicant: General Mills, Inc., Minneapolis, MN (US)

(72) Inventors: Brent M Anderson, Minneapolis, MN (US); Mitch Leuthard, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 16/379,315

(22) Filed: Apr. 9, 2019

(65) Prior Publication Data

US 2019/0308205 A1      Oct. 10, 2019

Related U.S. Application Data

(60) Provisional application No. 62/655,428, filed on Apr. 10, 2018.

(51) Int. Cl.
| | |
|---|---|
| *B67C 3/26* | (2006.01) |
| *B05B 1/14* | (2006.01) |
| *B67D 3/00* | (2006.01) |
| *B65B 39/00* | (2006.01) |

(52) U.S. Cl.
CPC .............. *B67C 3/2608* (2013.01); *B05B 1/14* (2013.01); *B67D 3/0029* (2013.01); *B67D 3/0058* (2013.01); *B65B 2039/009* (2013.01)

(58) Field of Classification Search
CPC .... B67C 3/2608; B65B 2039/009; B65B 3/22

USPC .......................................................... 141/31
See application file for complete search history.

(56) References Cited

U.S. PATENT DOCUMENTS

| | | | |
|---|---|---|---|
| 2,030,951 A | * | 2/1936 | Winton ..................... B65B 3/30 222/305 |
| 4,151,698 A | | 5/1979 | Müller et al. |
| 4,410,108 A | * | 10/1983 | Minard ................. B65B 39/001 141/261 |

(Continued)

FOREIGN PATENT DOCUMENTS

| | | |
|---|---|---|
| DE | 3537753 | 4/1987 |
| FR | 2459177 | 1/1981 |

(Continued)

*Primary Examiner* — Timothy P. Kelly
(74) *Attorney, Agent, or Firm* — Diederiks & Whitelaw, PLC; Annette M. Frawley, Esq.

(57) ABSTRACT

A filling apparatus includes a container, a conveyor system for transporting the container and a fill nozzle for filling the container. The fill nozzle includes a product inlet for receiving an edible liquid and a chamber fluidly connected to the product inlet. The fill nozzle also includes an elastomeric seal located within the chamber and a piston located at least partially within the chamber. The piston has a capillary tube selectively fluidly connected to the chamber. The capillary tube includes a capillary tube inlet and a capillary tube outlet. In a static state, the elastomeric seal seals the capillary tube inlet to prevent the edible liquid from flowing into the capillary tube inlet. In a filling state, the elastomeric seal does not seal the capillary tube inlet, allowing the edible liquid to flow into the capillary tube inlet, out of the capillary tube outlet and into the container.

25 Claims, 8 Drawing Sheets

(56) References Cited

U.S. PATENT DOCUMENTS

| | | | |
|---|---|---|---|
| 4,512,379 A * | 4/1985 | Hennig | B65B 3/22 |
| | | | 141/286 |
| 4,711,277 A * | 12/1987 | Clish | B65B 3/22 |
| | | | 141/311 A |
| 5,524,683 A | 6/1996 | Mueller | |
| 5,529,099 A | 6/1996 | Janek et al. | |
| 8,833,407 B2 * | 9/2014 | Clusserath | B67C 3/2608 |
| | | | 141/128 |
| 9,056,758 B2 * | 6/2015 | Clusserath | B67D 3/0058 |
| 9,505,506 B2 | 11/2016 | Ammann | |
| 9,926,088 B2 * | 3/2018 | Auer | B65B 3/22 |
| 10,562,655 B2 * | 2/2020 | Heuser | C22C 14/00 |
| 2005/0028886 A1 | 2/2005 | Navarro et al. | |
| 2007/0092626 A1 | 4/2007 | Singer et al. | |
| 2012/0186695 A1 * | 7/2012 | Clusserath | B67C 3/2608 |
| | | | 141/115 |
| 2015/0071802 A1 | 3/2015 | Goldbrunner et al. | |
| 2016/0215176 A1 | 7/2016 | Kanderski et al. | |
| 2016/0257436 A1 | 9/2016 | Goldbunner et al. | |
| 2017/0144784 A1 | 5/2017 | Illi | |
| 2017/0283102 A1 | 10/2017 | Strauch | |
| 2017/0283104 A1 | 10/2017 | Daniel | |
| 2019/0127117 A1 | 5/2019 | Clements et al. | |

FOREIGN PATENT DOCUMENTS

| | | |
|---|---|---|
| FR | 2889175 | 2/2007 |
| JP | H07291225 | 11/1995 |

* cited by examiner

APPARATUS AND METHOD FOR FILLING A CONTAINER

CROSS-REFERENCE TO RELATED APPLICATIONS

The present application claims the benefit of U.S. Provisional Application Ser. No. 62/655,428 filed Apr. 10, 2019 entitled "Apparatus and Method for Filling a Container". The content of this application is incorporated herein by reference.

BACKGROUND OF THE INVENTION

The present invention pertains to dairy-based and plant-based food products and, more particularly, to the production of dairy-based and plant-based food products.

It has been found that, when consumers are deciding which of a selection of goods to purchase, consumers consider the packaging of the different goods. Accordingly, it is important to evaluate the packaging of goods when offering goods for sale, especially if the goods are sold adjacent to competing goods. In the context of food products, food products are often sold in supermarkets next to other competing products. As such, significant effort is frequently put into creating food product packaging that both grabs the attention of consumers and makes the products more appealing upon inspection.

Regarding products such as yogurt, other cultured dairy products (e.g., sour cream), mousse and pudding, these products are sometimes sold packaged with additional ingredients. Such ingredients can include fruit, granola, nuts and chocolate, for example. The ingredients can be pre-mixed with the yogurt, mousse or pudding, or the ingredients can be packaged with the expectation that the consumer will mix all the ingredients together prior to or during consumption, as with fruit-on-the-bottom yogurt, for example. For fruit-on-the-bottom-type products, it is desirable to be able to highlight the fruit by ensuring that the fruit is visible through the sidewalls of the product packaging. This can be accomplished by depositing the fruit in the center of the packaging and then forcing the fruit to the sidewalls using a blast of air, as discussed in U.S. application Ser. No. 15/797,154, which is incorporated herein by reference. Once the fruit is in contact with the sidewalls, it is important not to simply wash the fruit back off the sidewalls when depositing the yogurt, mousse or pudding (or the liquid that will form this product) into the packaging. Accordingly, it would be desirable to provide a way to gently fill product containers such that ingredients in contact with the sidewalls of the containers are not washed off the sidewalls when the containers are filled.

It would also be desirable to eliminate drips during filling to ensure that no product ends up on the portion of the container that is sealed. Otherwise, this leads to leaks in the seal and the need for high sealing forces, making it difficult for a consumer to open the container. Further, it would be desirable for the filling apparatus to be easy to clean.

SUMMARY OF THE INVENTION

In view of the above, the present invention provides a fill nozzle that gently fills product containers with an edible liquid. In addition, the design of the fill nozzle eliminates drips when the nozzle is closed. Specifically, a filling apparatus comprises a container, a conveyor system configured to transport the container and a fill nozzle configured to fill the container. The fill nozzle includes a product inlet configured to receive an edible liquid and a chamber fluidly connected to the product inlet. The fill nozzle also includes an elastomeric seal located within the chamber and a selectively shiftable piston located at least partially within the chamber. The piston has a capillary tube selectively fluidly connected to the chamber. The capillary tube includes a capillary tube inlet and a capillary tube outlet. The fill nozzle is configured such that, in a static state, the elastomeric seal seals the capillary tube inlet to prevent the edible liquid from flowing into the capillary tube inlet. In a filling state, the elastomeric seal does not seal the capillary tube inlet, allowing the edible liquid to flow into the capillary tube inlet, out of the capillary tube outlet and into the container. The capillary tube is configured such that, due to capillary action, the edible liquid does not flow out of the capillary tube outlet when the capillary tube inlet is sealed and the edible liquid is located within the capillary tube. The capillary tube includes a fluid passage fluidly connected to and extending from the capillary tube inlet to the capillary tube outlet. A first portion of the fluid passage extends from the capillary tube outlet. The first portion is angled with respect to vertical such that the edible liquid flowing out of the capillary tube outlet is angled with respect to vertical. The container includes a sidewall and a bottom wall, and the filling apparatus is configured such that the edible liquid flowing out of the capillary tube outlet contacts the sidewall prior to contacting the bottom wall.

To provide for easy cleaning, the fill nozzle includes a cleaning inlet configured to receive a cleaning fluid. The chamber is fluidly connected to the cleaning inlet.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1:
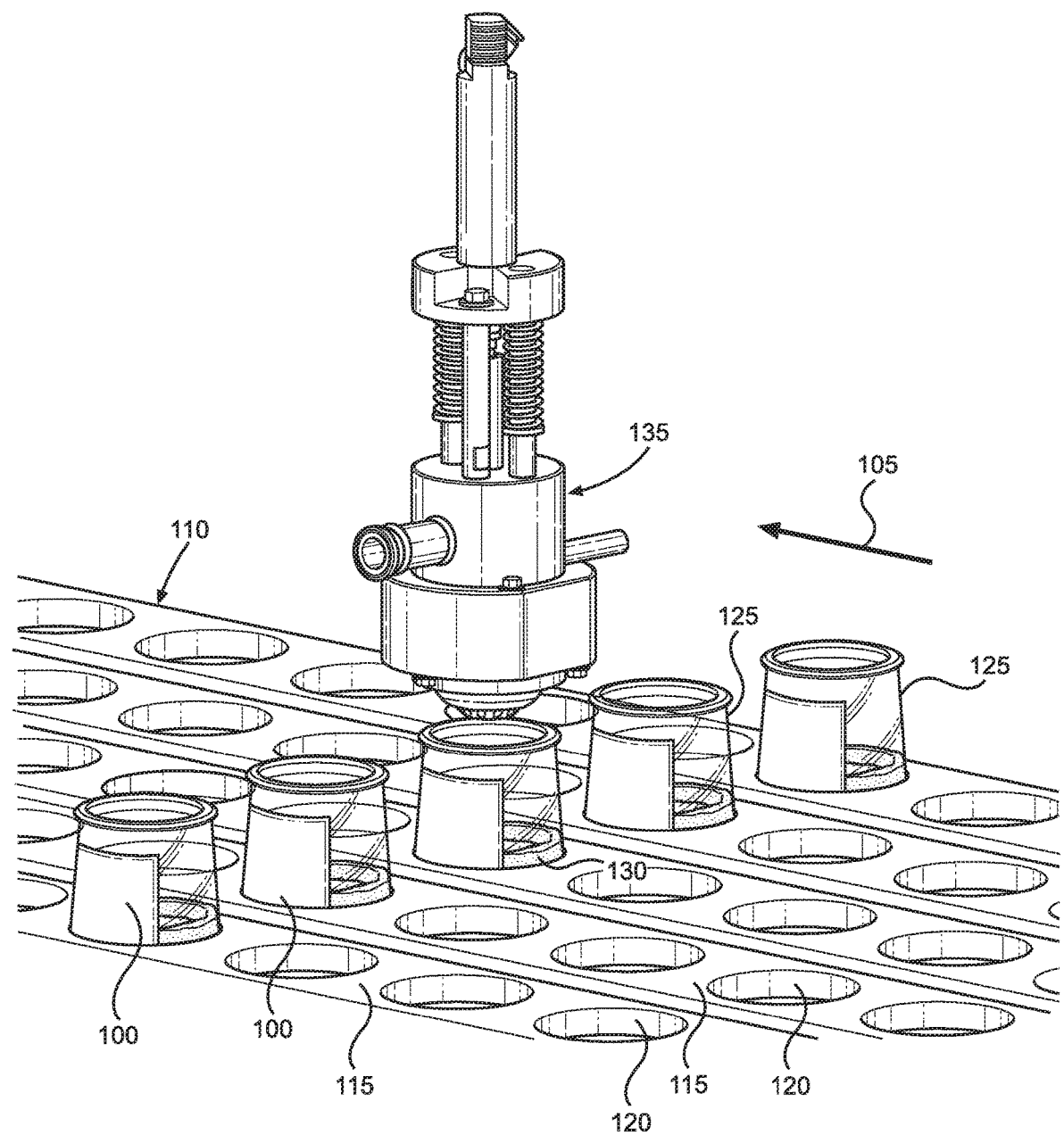
FIG. 1 is a perspective view of a portion of a production line for producing yogurt products in accordance with the present invention.

With initial reference to FIG. 1, there is shown a portion of a production line for producing yogurt products in accordance with the present invention. Specifically, FIG. 1 shows a plurality of containers 100 being transported in a direction 105 by a conveyor system 110. In the embodiment illustrated, conveyor system 110 includes a plurality of conveyor belts 115. Each of conveyor belts 115 has a plurality of holes 120 in which containers 100 are supported. However, other conveyor systems known in the art can be used with the present invention.

Containers 100 are preferably made from a fully or partially transparent or translucent material so that the contents of containers 100 are at least partially visible through sidewalls 125 of containers 100. Most preferably, containers 100 are made from glass or a plastic such as polypropylene or polyethylene terephthalate (PET). Of course, other materials can be used for containers 100 if desired (e.g., waxed paperboard). At the point in the process illustrated in FIG. 1, each of containers 100 contains a mix-in 130. Preferably, mix-in 130 is a viscous liquid. In one embodiment, mix-in 130 comprises fruit, such as strawberries, blueberries, cherries, lemons or peaches. If desired, the fruit can be dried (e.g., raisins or dried cherries, cranberries pieces or dates), or the fruit can take the form of a fruit preparation or fruit preserves (e.g., a jam or jelly). In other embodiments, mix-in 130 comprises coconut, peanuts, tree nuts, chocolate chunks, ginger, or granola flakes, for example. For purposes of the overall invention, it is desired to avoid having mix-in 130 clump in the center of each container 100, particularly the center of the bottom wall (not visible). Instead, mix-in 130 is positioned, either manually or mechanically, toward sidewall 125. Because of the viscosity of mix-in 130, mix-in 130 tends to remain in contact with sidewall 125, as shown in FIG. 1. Accordingly, when the remaining contents are added to containers 100, mix-in 130 is still visible through sidewalls 125.

In accordance with the invention, these remaining contents are deposited in containers 100 using a fill nozzle 135. In some embodiments, fill nozzle 135 deposits a dairy product in containers 100. In other embodiments, fill nozzle 135 deposits a plant product in containers 100. Preferably, the dairy or plant product comprises milk (e.g., cow's milk, coconut milk), which is later fermented in container 100 to form yogurt in a pot-set method. As such, the dairy or plant product preferably further comprises a yogurt culture. Alternatively, the dairy or plant product can comprise yogurt, pudding or mousse.

For ease of illustration, only one row of containers 100 is shown in FIG. 1. However, in use, each of holes 120 receives a corresponding container 100. Similarly, only one fill nozzle 135 is shown. In practice though, each conveyor belt 115 is provided with a corresponding fill nozzle 135. Depending on the spacing of conveyor belts 115 and the size of each fill nozzle 135, some or all of fill nozzles 135 can be offset from one another in direction 105 to provide sufficient room for each fill nozzle 135, i.e., fill nozzles 135 need not be aligned in a single row.

Figure 2:
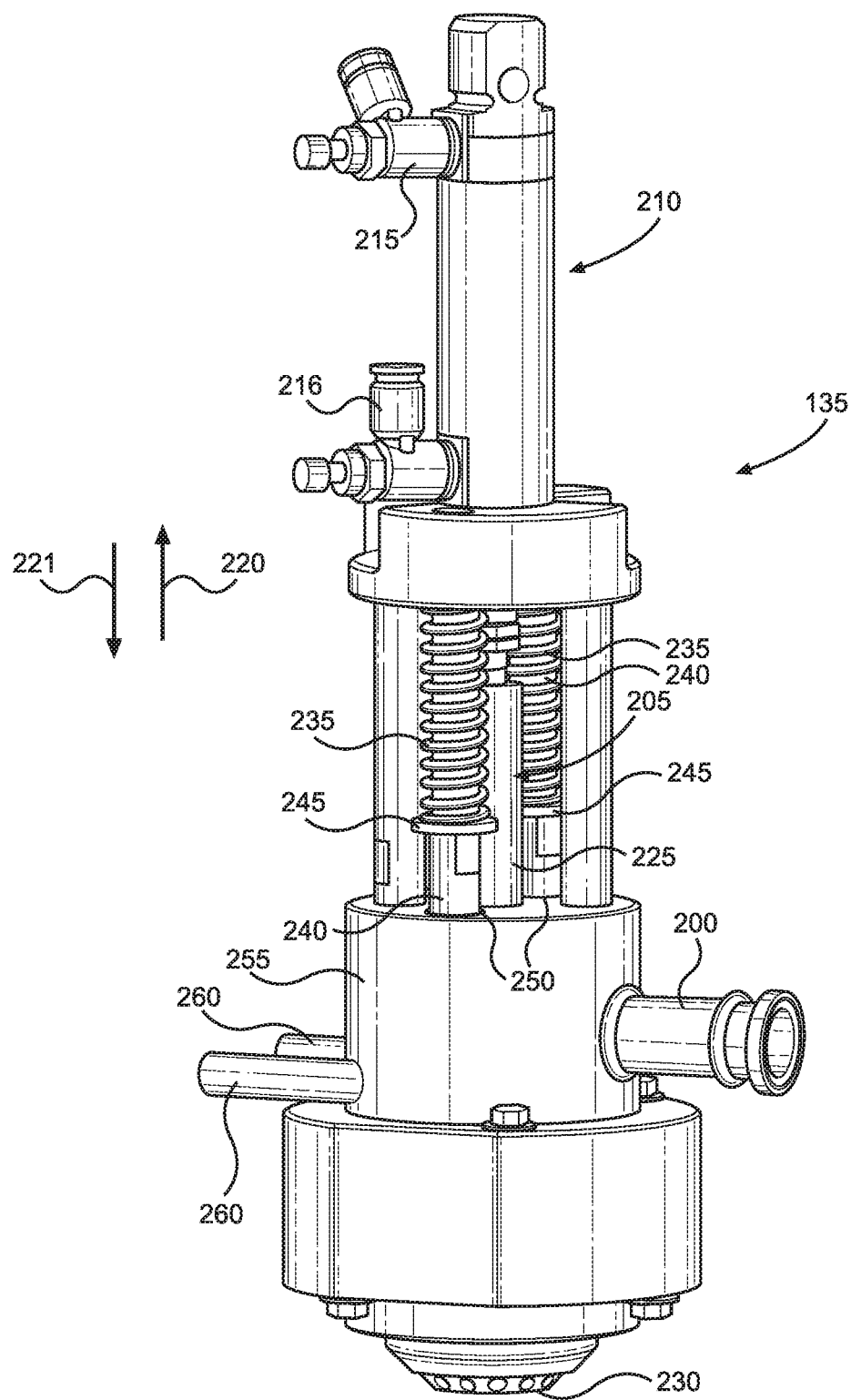
FIG. 2 is a perspective view of a fill nozzle constructed in accordance with the present invention.

Turning to FIG. 2, fill nozzle 135 is shown in more detail. Fill nozzle 135 includes a product inlet 200 configured to receive an edible liquid (not shown), which is later deposited in containers 100. As discussed above, the edible liquid can be a dairy or plant product, such as milk, or the edible liquid can be a pasteurized base comprising a milk and other edible ingredients for the production of cultured and uncultured dairy and plant-based dairy-like products, such as yogurt, pudding or mousse.

Fill nozzle 135 also includes a piston assembly 205 and a pneumatic cylinder 210 configured to control movement of piston assembly 205. Pneumatic cylinder 210 has a first valve 215 and a second valve 216, which control the flow of gas into and out of pneumatic cylinder 210. The gas acts on a piston (not visible) of piston assembly 205. Depending on the relative pressure exerted on each side of the piston, the piston is caused to move up (in a direction 220) or down (in a direction 221). In other words, the piston moves vertically along the longitudinal axis of fill nozzle 135. Piston assembly 205 also has a piston rod 225 and a piston head 230. The piston is connected to piston head 230 by piston rod 225 such that movement of the piston causes corresponding vertical movement of piston head 230.

Fill nozzle 135 further includes a plurality of compression springs 235. Each of compression springs 235 is wound around a rod 240 having a stop 245. Compression springs 235 bias rods 240 in direction 221, with stops 245 limiting motion of rods 240. Specifically, rods 240 pass through holes 250 in a housing 255 of fill nozzle 135, while stops 245 cannot. Accordingly, after a certain amount of vertical movement in direction 221, stops 245 contact housing 255, preventing further movement. Piston assembly 205 also limits the motion of rods 240, as will be discussed in more detail below.

Fill nozzle 135 includes a plurality of cleaning inlets 260 configured to receive a cleaning fluid (not shown), which is used to clean fill nozzle 135. The cleaning fluid can be water, for example. Alternatively, the cleaning fluid can be a fluid specifically designed for cleaning.

Figure 3:
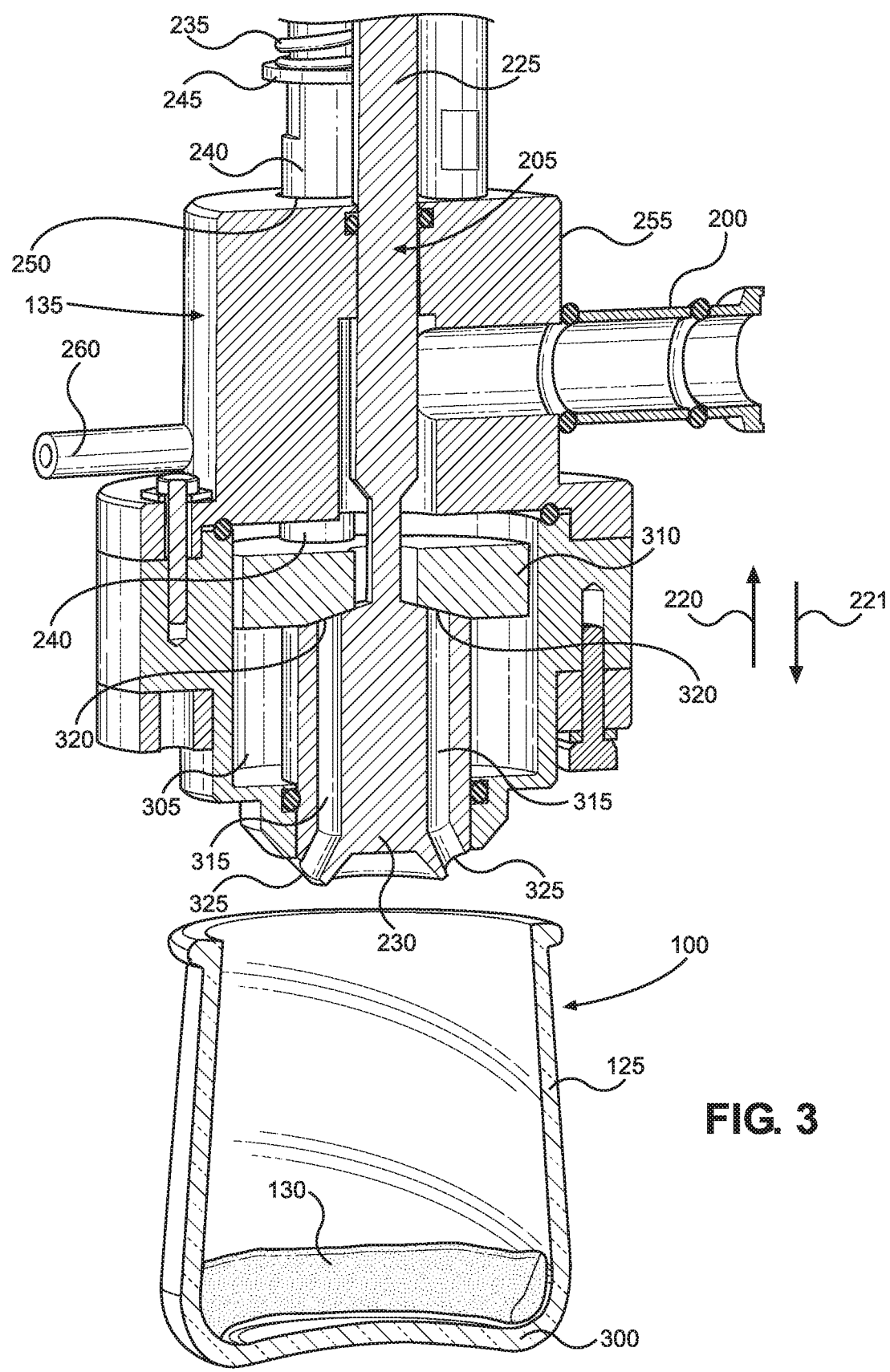
FIG. 3 is a cross section of the fill nozzle in a static state.

With reference now to FIG. 3, a cross section of fill nozzle 135 and one of containers 100 is provided. For ease of illustration, conveyor system 110 is not shown. As can be more clearly seen in this view, mix-in 130 is not clumped in a center of a bottom wall 300 of container 100, but rather is positioned along sidewall 125.

Fill nozzle 135 includes a chamber 305 fluidly connected to product inlet 200. An elastomeric seal 310 is located within chamber 305. Elastomeric seal 310 is coupled to rods 240 such that compression springs 235 bias elastomeric seal 310 in direction 221. Specifically, compression springs 235 bias elastomeric seal 310 into contact with piston head 230. This contact limits motion of rods 240 while the force applied to piston assembly 205 by pneumatic cylinder 210 in direction 220 is greater than the force applied to elastomeric seal 310 by compression springs 235 in direction 221, as is the case in FIG. 3.

The diameter of elastomeric seal 310 is less than the diameter of chamber 305. Accordingly, edible liquid entering chamber 305 from product inlet 200 can flow around elastomeric seal 310 to the lower portion of chamber 305. However, the edible liquid cannot exit fill nozzle 135 because there is no available pathway.

Piston head 230 is located at least partially within chamber 305. Piston head 230 has a plurality of capillary tubes 315 selectively fluidly connected to chamber 305. In particular, each of capillary tubes 315 includes a capillary tube inlet 320 and a capillary tube outlet 325. When elastomeric seal 310 is in contact with piston head 230, elastomeric seal 310 seals capillary tube inlets 320 to prevent edible liquid in chamber 305 from flowing into capillary tubes 315 via capillary tube inlets 320. As a result, no edible liquid flows out of capillary tube outlets 325 into container 100. For purposes of the present invention, the state of fill nozzle 135 illustrated in FIG. 3 is considered the static state. Fill nozzle 135 remains in the static state between fill cycles.

Figure 4:
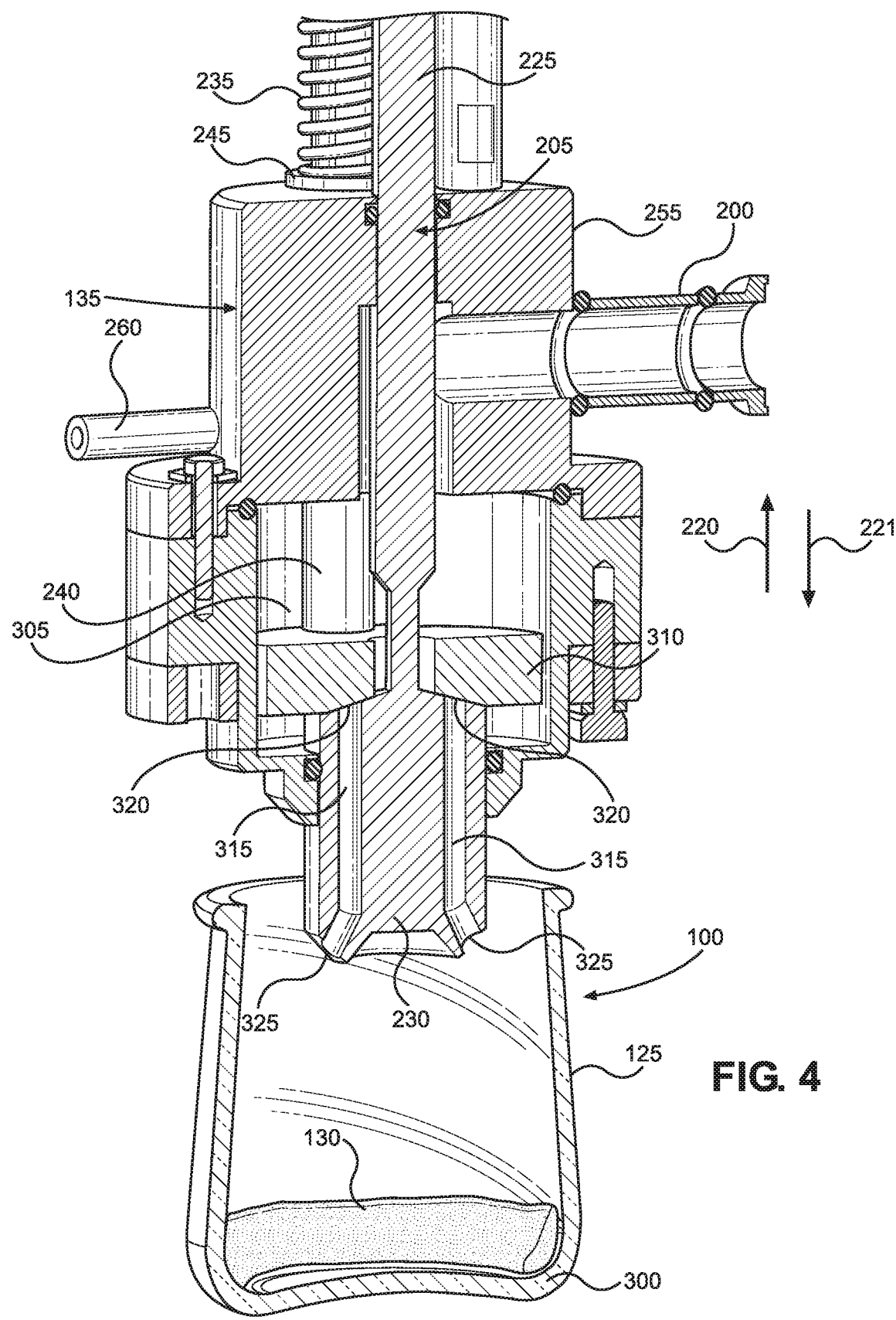
FIG. 4 is a cross section of the fill nozzle in an intermediate state.

FIG. 4 shows fill nozzle 135 in an intermediate state. To move from the static state to the intermediate state, the force applied to piston assembly 205 by pneumatic cylinder 210 is adjusted. Specifically, the net force applied by pneumatic cylinder 210 in direction 220 is reduced to a sufficient degree that compressions springs 235 are able to move piston assembly 205 in direction 221 via contact between elastomeric seal 310 and piston head 230. However, pneumatic cylinder 210 does still apply some net force to piston assembly 205 in direction 220. Accordingly, elastomeric seal 310 remains in contact with piston head 230 to seal capillary tube inlets 320, and movement of piston assembly 205 in direction 221 is arrested when stops 245 contact housing 255.

In one embodiment, piston assembly 205 moves 20 millimeters (mm) in direction 221 between the static state and the intermediate state. As a result, a portion of piston head 230 is now located within container 100. In the static state, no portion of piston head 230 is located within container 100. This allows container 100 to move along conveyor system 110 without contacting fill nozzle 135.

Figure 5:
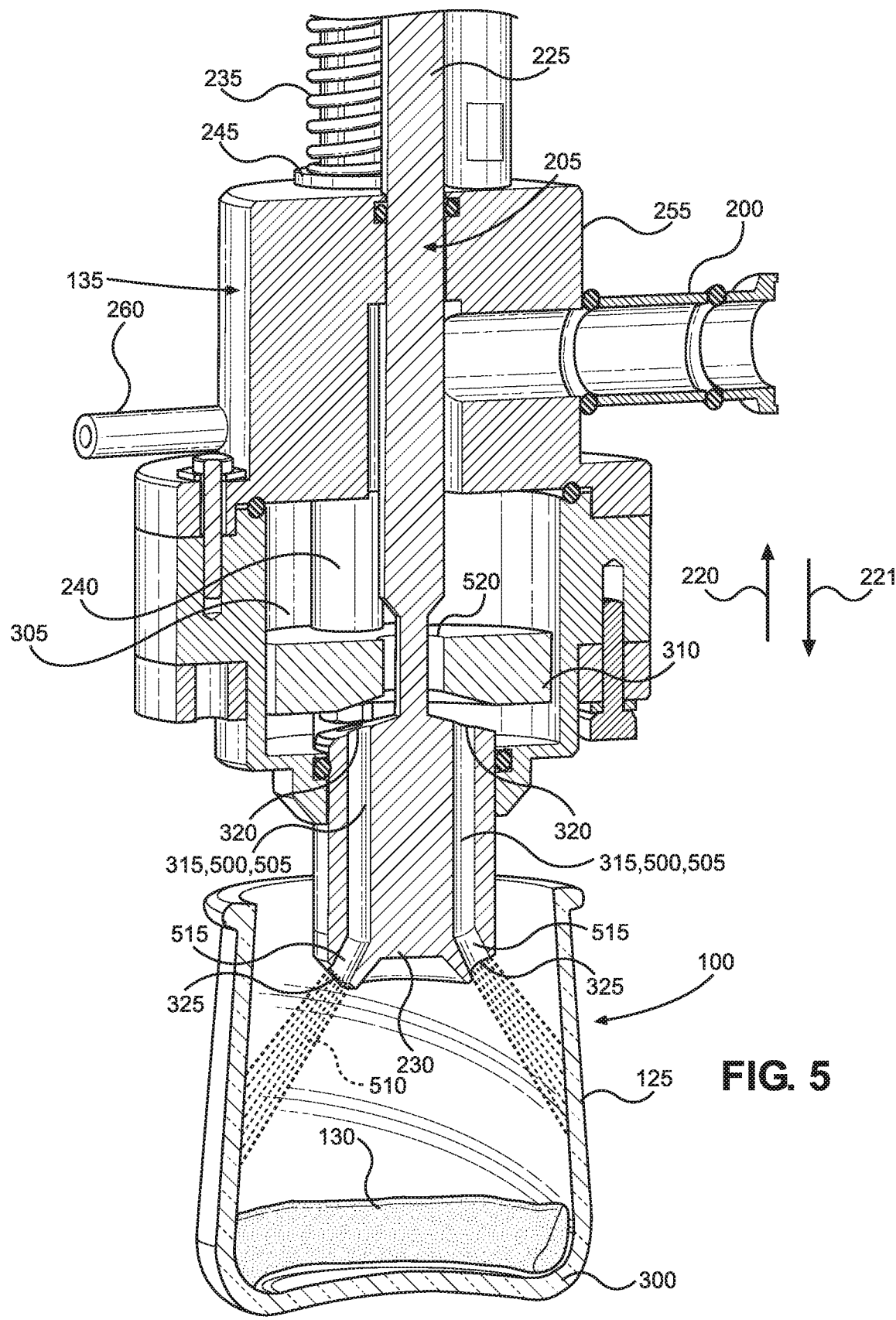
FIG. 5 is a cross section of the fill nozzle in a filling state.

FIG. 5 shows fill nozzle 135 in a filling state. To move from the intermediate state to the filling state, the force applied to piston assembly 205 by pneumatic cylinder 210 is again adjusted. Specifically, a net force is applied by pneumatic cylinder 210 in direction 221, causing piston assembly 205 to move in direction 221. Due to contact between stops 245 and housing 255, compression springs 235 are not able to move any further in direction 221. As a result, elastomeric seal 310 no longer contacts piston head 230, and capillary tube inlets 320 are unsealed.

At this point, the edible liquid in chamber 305 flows from chamber 305, through capillary tube inlets 320, out of capillary tube outlets 325 and into container 100. In particular, each of capillary tubes 315 includes a fluid passage 500 fluidly connected to and extending from capillary tube inlet 320 to capillary tube outlet 325. A first portion 505 of fluid passage 500 extends inward from capillary tube outlet 325. First portion 505 is angled with respect to vertical such that the edible liquid flowing out of capillary tube outlets 325 is angled with respect to vertical. This flow path is labeled 510 in FIG. 5. A second portion 515 of fluid passage 500 extends inward from capillary tube inlet 320 to meet first portion 505. Second portion 515 is parallel to vertical.

Preferably, the angle between first portion 505 and vertical is in the range of 145-155°. For purposes of the present invention, the relevant angle is the angle between first portion 505 and the portion of vertical extending in direction 220 from first portion 505. The angle of first portion 505 is chosen based on a variety of factors including the angle of sidewall 125 and the location of capillary tube outlet 325 relative to container 100. Since a gentle flow of edible liquid is desired, it is preferred that the edible liquid hit sidewall 125 at an angle less than 90° (as illustrated by flow path 510) such that the edible liquid runs down sidewall 125 rather than bouncing off of sidewall 125. Also, upon hitting sidewall 125, the edible liquid flows both up and down sidewall 125. Accordingly, it is preferred that the edible liquid not hit sidewall 125 close enough to the opening of container 100 to cause the edible liquid to flow out of container 100 or end up on the rim of container 100.

In one embodiment, piston assembly 205 moves 5 mm in direction 221 between the intermediate state and the filling state. As a result, piston head 230 extends even further into container 100. Due to the positioning of piston head 230 within container 100, the angled flow of the edible liquid out of capillary tube outlets 325 and the distance between capillary tube outlets 325 and sidewall 125 of container 100, the edible liquid flowing out of capillary tube outlets 325 is initially directed onto sidewall 125 and thereby contacts sidewall 125 prior to flowing to bottom wall 300 of container 100 or mix-in 130. The relative gentleness of this filling method avoids splashing onto an upper rim (not separately labeled here) of container 125 and helps prevent mix-in 130 from being washed off of sidewall 125. Preferably, fill nozzle 135 and container 100 are configured such that the streams of edible liquid from adjacent capillary tubes 315 join after contacting sidewall 125 and before contacting mix-in 130.

As discussed above, edible liquid within chamber 305 can flow around the outside of elastomeric seal 310. In addition, the edible liquid can flow through a hole 520 in the center of elastomeric seal 310 once elastomeric seal 310 is no longer in contact with piston head 230. Of course, it should be recognized that edible liquid can still enter hole 520 when elastomeric seal 310 is in contact with piston head 230. Piston rod 225 extends through hole 520 but has a narrower diameter than hole 520 at this point, which allows the edible liquid to flow between piston rod 225 and elastomeric seal 310.

Figure 6:
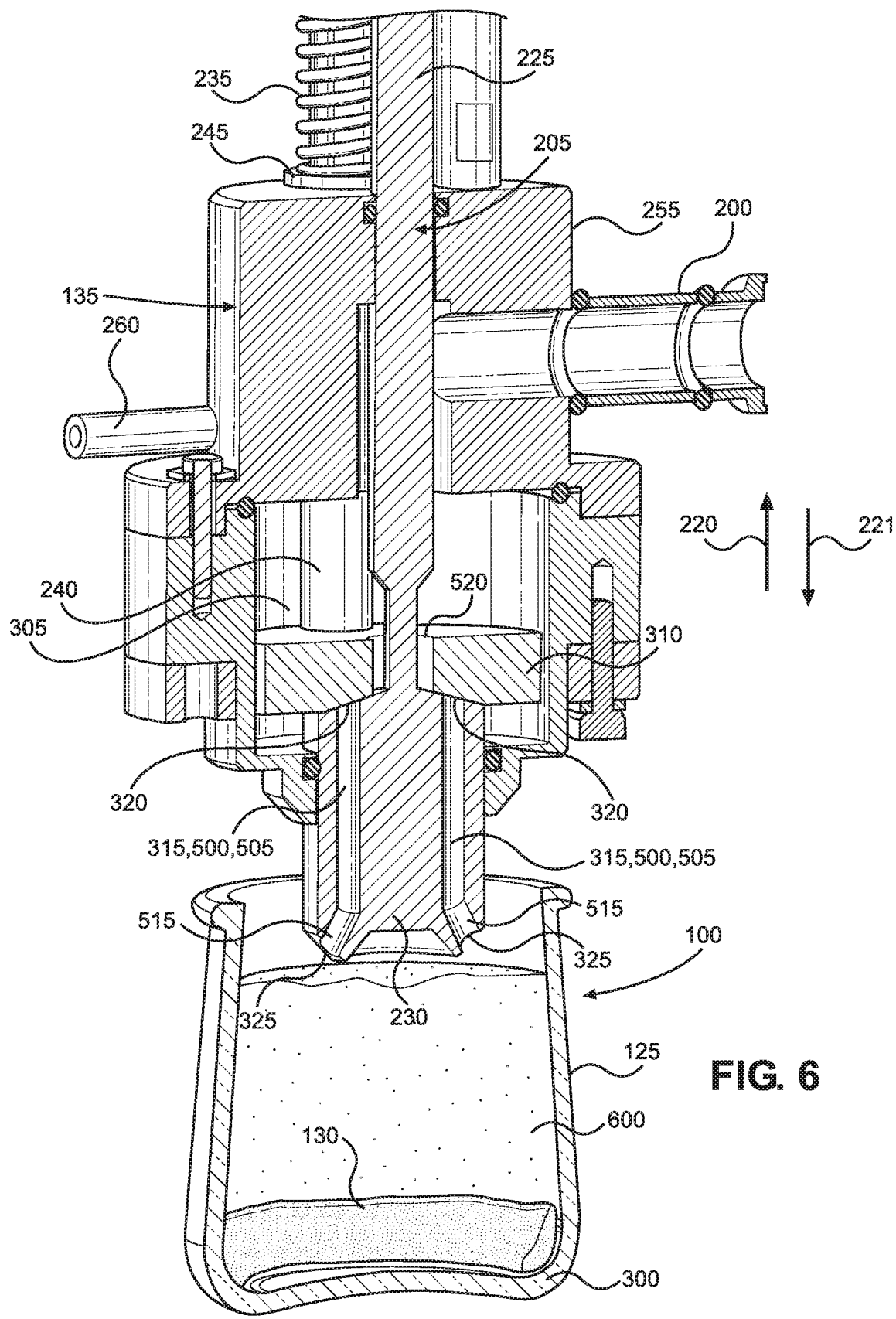
FIG. 6 is a cross section of the fill nozzle in the intermediate state, showing a filled yogurt container.

Once container 100 has been filled with the edible liquid, pneumatic cylinder 210 causes piston assembly 205 to be retracted, and fill nozzle 135 reenters the intermediate state, as shown in FIG. 6. For purposes of the present invention, the term "fill" does not require that container 100 be completely filled. Rather, container 100 is as full of the edible liquid as desired. In FIG. 6, the edible liquid in container 100 is labeled 600. As can be seen in FIG. 6, container 100 has been filled but is not completely full.

To move piston assembly 205 from the position shown in FIG. 5 to the position shown in FIG. 6, a net force is applied to piston assembly 205 in direction 220 by pneumatic cylinder 210. This force is sufficiently low that compression springs 235 maintain elastomeric seal 310 in place when piston head 230 contacts elastomeric seal 310. As discussed previously, contact between piston head 230 and elastomeric seal 310 results in capillary tube inlets 320 being sealed by elastomeric seal 310. When capillary tube inlets 320 are sealed, no edible liquid can enter capillary tubes 315 from chamber 305. Also, due to capillary action and air pressure, any edible liquid that remains in capillary tubes 315 when piston assembly 205 is moved to the position shown in FIG. 6 will be prevented from flowing out of capillary tube outlets 325. That is, once elastomeric seal 310 seals capillary tube inlets 320, surface tension between the molecules of the edible liquid, adhesive forces between the edible liquid and piston head 230 and air pressure acting on the edible liquid from below prevent the edible liquid from dripping out of capillary tube outlets 325.

The ability of capillary tubes 315 to retain the edible liquid due to capillary action is affected by the diameter of capillary tubes 315. In addition, the ability of capillary tubes 315 to retain the edible liquid due to air pressure is affected by the length of capillary tubes 315. For purposes of the present invention, "capillary tubes" are tubes that are sized such that capillary action and air pressure are sufficient, in combination, to retain the edible liquid in the tubes without dripping when the inlets of the tubes are sealed. In one embodiment, first portion 505 of capillary tubes 315 is 39 mm in length, second portion 515 is 9 mm in length, and capillary tubes 315 have a diameter of 4.76 mm. However, it should be understood that capillary tubes constructed in accordance with the present invention can have different dimensions depending on factors such as the density of the edible liquid, desired flow characteristics, the sizes of the piston head and container, the rate at which the edible liquid enters the product inlet, etc. Generally, it is preferred that capillary tubes 315 are sufficiently small to retain the edible liquid in capillary tubes 315 without dripping and sufficiently large to avoid a turbulent, high velocity flow of edible liquid (which can wash mix-in 130 off of sidewall 125). In some exemplary embodiments, capillary tubes 315 have diameters in the range of 4.76-8.00 mm, and edible liquid flows out of capillary tube outlets 325 with a velocity in the range of 0.37-0.49 meters/second. Preferably, the flow of edible liquid within capillary tubes 315 is laminar (i.e., the flow has a Reynolds number below 2,300) to provide for gentle filling of containers 100. Most preferably, the flow of edible liquid within capillary tubes 315 has a Reynolds number below 2,000. In some exemplary embodiments, the flow has a Reynolds number in the range of 1,500-1,930.

Figure 7:
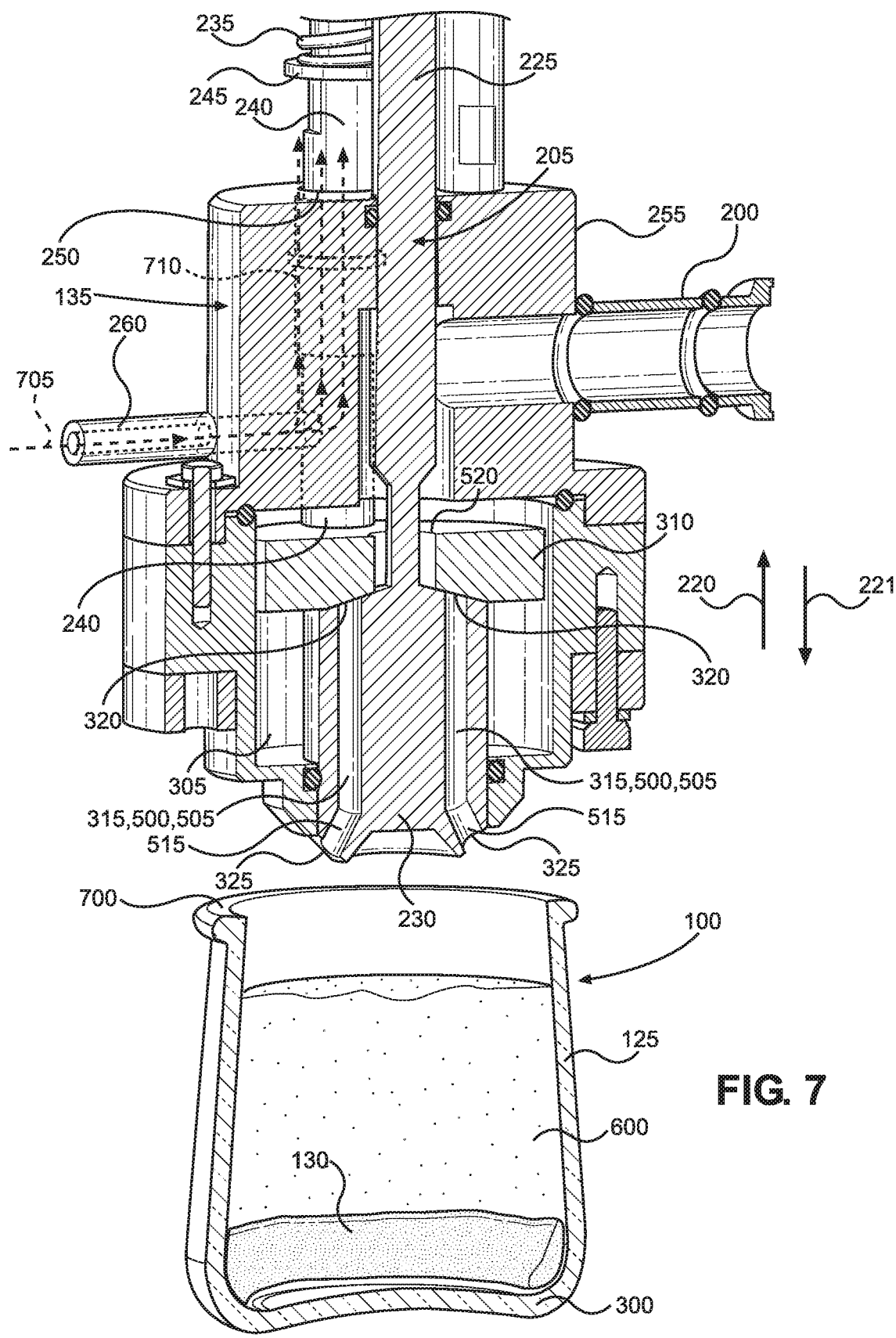
FIG. 7 is a cross section of the fill nozzle in the static state, showing a filled yogurt container.

After piston assembly 205 has been retracted to the position shown in FIG. 6, pneumatic cylinder 210 causes piston assembly 205 to be further retracted, and fill nozzle 135 enters the static state, as shown in FIG. 7. To move piston assembly 205 from the position shown in FIG. 6 to the position shown in FIG. 7, a net force is applied to piston assembly 205 in direction 220 by pneumatic cylinder 210. This force is sufficiently high that contact between piston head 230 and elastomeric seal 310 results in elastomeric seal 310 and rods 240 moving in direction 220, thereby compressing compression springs 235. Capillary tube inlets 320 remain sealed due to continued contact between elastomeric seal 310 and piston head 230. Due to capillary action, any edible liquid that remains in capillary tubes 315 is prevented from flowing out of capillary tube outlets 325. The lack of dripping from fill nozzle 135 is beneficial since it prevents edible liquid from ending up on a rim 700 of container 100 as container 100 is moved beneath fill nozzle 135 by conveyor system 110. Rim 700 is the portion of container 100 that is sealed. Accordingly, if edible liquid were to drip onto rim 700, this could lead to leaks in the seal and/or the need for excessively high sealing forces, making it difficult for a consumer to open container 100.

Preferably, the speed at which piston assembly 205 is retracted as filling nozzle 135 transitions from the filling state to the static state is slower than the speed at which piston assembly 205 is extended as filling nozzle 135 transitions from the static state to the filling state. In other words, the amount of time spent retracting piston assembly 205 is greater than the amount of time spent extending piston assembly 205. This helps prevent the edible liquid from flowing out through capillary tube outlets 325 during retraction, while allowing extension to take place relatively more quickly.

FIG. 7 also shows a flow path 705 for the periodic introduction of cleaning fluid received by one of cleaning inlets 260. The other cleaning inlet 260 is not shown but functions in the same manner. When it is desired to clean fill nozzle 135, cleaning fluid is caused to flow into fill nozzle 135 through cleaning inlets 260. The cleaning fluid contacts the exteriors of rods 240 and travels upward along rods 240 within holes 250. A bushing 710 is coupled to each of rods 240. The cleaning fluid flows through bushings 710 and then out of holes 250. This arrangement allows any edible liquid that has been carried into holes 250 by motion of rods 240 to be cleaned out of holes 250 and off of rods 240. To clean the remainder of fill nozzle 135, cleaning fluid can be caused to flow into product inlet 200, and pneumatic cylinder 210 controls piston assembly 205 such that fill nozzle 135 repeatedly moves through the static, intermediate and filling states until fill nozzle 135 is clean. Advantageously, fill nozzle 135 can be cleaned in situ, i.e., fill nozzle 135 does not need to be moved or disassembled relative to conveyor belts 115 for cleaning.

In one embodiment, piston head 230 has twelve capillary tubes 315. However, other numbers of capillary tubes 315 can be used. In one embodiment, the duration of each fill cycle is in the range of 1.2-1.3 seconds. That is, fill nozzle 135 transitions from the static state to the filling state and back to the static state in 1.2-1.3 seconds. In one embodiment, the flow rate of edible liquid from fill nozzle 135 to container 100 is 98.2 cubic centimeters/second.

Figure 8:
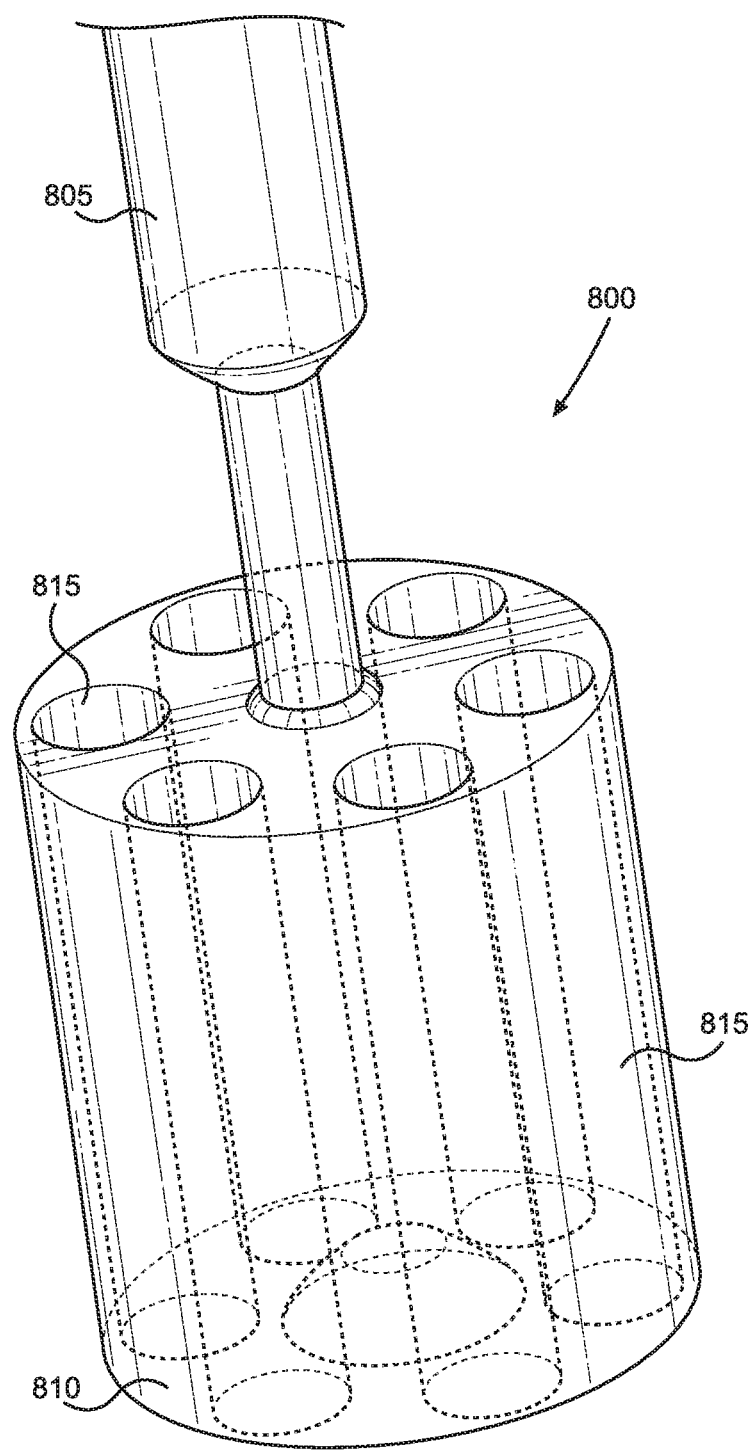
FIG. 8 is a perspective view of a piston assembly constructed in accordance with another embodiment of the present invention.

FIG. 8 shows a piston assembly 800 constructed in accordance with another embodiment of the present invention. Like piston assembly 205, piston assembly 800 has a piston (not visible), a piston rod 805 and a piston head 810. Piston head 810 includes a plurality of capillary tubes 815. Piston assembly 800 is usable with fill nozzle 135 and functions in the same manner as piston assembly 205 except that capillary tubes 815 are straight, i.e., capillary tubes 815 do not include angled portions. Since such an arrangement tends to provide for a less gentle filling of containers 100, piston assembly 800 is preferably used when no mix-in 130 is included in containers 100. Alternatively, other modifications can be made to the overall arrangement to provide for the desired gentle filling, e.g., piston assembly 800 can be extended further into containers 100 during filling. It is also possible to use piston assembly 800 with relatively more viscous mix-ins 130 since washing these mix-ins 130 off sidewalls 125 is less of a concern.

Based on the above, it should be readily apparent that the present invention provides a way to gently fill yogurt containers such that non-yogurt ingredients in contact with the sidewalls of the containers are not washed off the sidewalls when the containers are filled. In addition, the present invention eliminates drips during filling to ensure that no product ends up on the portion of the container that is sealed. The filling apparatus is also easy to clean. While certain preferred embodiments of the present invention have been set forth, it should be understood that various changes or modifications could be made without departing from the spirit of the present invention. In general, the invention is only intended to be limited by the scope of the following claims.

The invention claimed is:
1. A filling apparatus comprising:
   a container;
   a conveyor system configured to transport the container; and
   a fill nozzle configured to fill the container, wherein the fill nozzle includes:
   a product inlet configured to receive a liquid;
   a chamber fluidly connected to the product inlet;
   a piston located at least partially within the chamber, wherein the piston has a capillary tube selectively fluidly connected to the chamber, and the capillary tube includes a capillary tube inlet and a capillary tube outlet; and
   an elastomeric seal located within the chamber and movable relative to the piston,
   wherein the fill nozzle is configured such that:
   in a static state, the elastomeric seal seals the capillary tube inlet to prevent the liquid from flowing into the capillary tube inlet; and in a filling state, the elastomeric seal is shifted so as to not seal the capillary tube inlet, allowing the liquid to flow into the capillary tube inlet, out of the capillary tube outlet and into the container, and the capillary tube is configured such that, due to capillary action, the liquid does not flow out of the capillary tube outlet when the capillary tube inlet is sealed and the liquid is located within the capillary tube.

2. The filling apparatus of claim 1, wherein:

the capillary tube includes a fluid passage fluidly connected to and extending from the capillary tube inlet to the capillary tube outlet;

a first portion of the fluid passage extends from the capillary tube outlet; and the first portion is angled with respect to vertical such that the liquid flowing out of the capillary tube outlet is angled with respect to vertical.

3. The filling apparatus of claim 2, wherein the container includes a sidewall and a bottom wall, and the filling apparatus is configured such that the liquid flowing out of the capillary tube outlet contacts the sidewall prior to contacting the bottom wall.

4. The filling apparatus of claim 2, wherein an angle between the first portion and vertical is in the range of 145-155°.

5. The filling apparatus of claim 1, wherein the fill nozzle is configured such that:

the piston is located in a first position in the static state;

the piston is located in a second position in an intermediate state; and in the intermediate state, the elastomeric seal seals the capillary tube inlet to prevent the liquid from flowing into the capillary tube inlet.

6. The filling apparatus of claim 5, wherein the fill nozzle is configured such that the piston is located in a third position in the filling state.

7. The filling apparatus of claim 1, wherein:

the fill nozzle is configured such that the piston is located in a first position in the static state and in a third position in the filling state; and the filling apparatus is configured such that:

when the piston is located in the first position, the piston is not located within the container; and when the piston is located in the third position, the piston is located at least partially within the container.

8. The filling apparatus of claim 1, wherein the fill nozzle further includes a cleaning inlet configured to receive a cleaning fluid, and the chamber is fluidly connected to the cleaning inlet.

9. The filling apparatus of claim 1, wherein the fill nozzle further includes a spring configured to bias the elastomeric seal into contact with the piston.

10. The filling apparatus of claim 1, wherein:

the piston has a plurality of capillary tubes selectively fluidly connected to the chamber, with the capillary tube being one of the plurality of capillary tubes;

each of the capillary tubes includes a capillary tube inlet and a capillary tube outlet; and the fill nozzle is configured such that, in the static state, the elastomeric seal seals each of the capillary tube inlets and, in the filling state, the elastomeric seal does not seal any of the capillary tube inlets.

11. A fill nozzle configured to fill a container, the fill nozzle comprising:

a product inlet configured to receive a liquid;

a chamber fluidly connected to the product inlet;

a piston located at least partially within the chamber, wherein the piston has a capillary tube selectively fluidly connected to the chamber, and the capillary tube includes a capillary tube inlet and a capillary tube outlet; and an elastomeric seal located within the chamber and movable relative to the piston, wherein the fill nozzle is configured such that:

in a static state, the elastomeric seal seals the capillary tube inlet to prevent the liquid from flowing into the capillary tube inlet; and in a filling state, the elastomeric seal is shifted so as to not seal the capillary tube inlet, allowing the liquid to flow into the capillary tube inlet, out of the capillary tube outlet and into the container, and the capillary tube is configured such that, due to capillary action, the liquid does not flow out of the capillary tube outlet when the capillary tube inlet is sealed and the liquid is located within the capillary tube.

12. The fill nozzle of claim 11, wherein:

the capillary tube includes a fluid passage fluidly connected to and extending from the capillary tube inlet to the capillary tube outlet;

a first portion of the fluid passage extends from the capillary tube outlet; and the first portion is angled with respect to vertical.

13. The fill nozzle of claim 12, wherein the filling apparatus is configured such that the liquid flowing out of the capillary tube outlet contacts a sidewall of the container prior to contacting a bottom wall of the container.

14. The fill nozzle of claim 12, wherein an angle between the first portion and vertical is in the range of 145-155°.

15. The fill nozzle of claim 11, wherein the fill nozzle is configured such that:

the piston is located in a first position in the static state;

the piston is located in a second position in an intermediate state; and in the intermediate state, the elastomeric seal seals the capillary tube inlet to prevent the liquid from flowing into the capillary tube inlet.

16. The fill nozzle of claim 11, further comprising a cleaning inlet configured to receive a cleaning fluid, wherein the chamber is fluidly connected to the cleaning inlet.

17. The fill nozzle of claim 11, further comprising a spring configured to bias the elastomeric seal into contact with the piston.

18. The fill nozzle of claim 11, wherein:

the piston has a plurality of capillary tubes selectively fluidly connected to the chamber, with the capillary tube being one of the plurality of capillary tubes;

each of the capillary tubes includes a capillary tube inlet and a capillary tube outlet; and the fill nozzle is configured such that, in the static state, the elastomeric seal seals each of the capillary tube inlets and, in the filling state, the elastomeric seal does not seal any of the capillary tube inlets.

19. A method of filling a container using a filling apparatus including a fill nozzle having a product inlet, a chamber fluidly connected to the product inlet, an elastomeric seal located within the chamber and a piston located at least partially within the chamber, wherein the elastomeric seal is movable relative to the piston, the piston has a capillary tube, and the capillary tube includes a capillary tube inlet and a capillary tube outlet, the method comprising:

positioning the container under the fill nozzle; and filling the container with the fill nozzle by:

receiving a liquid with the product inlet;

causing the liquid to flow from the product inlet to the chamber; and selectively fluidly connecting the capillary tube to the chamber by:

sealing the capillary tube inlet with the elastomeric seal to prevent the liquid from flowing into the capillary tube inlet; and unsealing the capillary tube inlet by shifting the elastomeric seal, allowing the liquid to flow into the capillary tube inlet, out of the capillary tube outlet and into the container, wherein, when the capillary tube inlet is sealed and the liquid is located within the capillary tube, the liquid does not flow out of the capillary tube outlet due to capillary action.

20. The method of claim 19, wherein filling the container with the fill nozzle includes causing the liquid to flow out of the capillary tube outlet at an angle with respect to vertical such that the container is filled with the liquid contacting a sidewall of the container prior to contacting a bottom wall of the container or a mix-in in contact with the sidewall, thereby preventing the mix-in from being washed off of the sidewall.

21. The method of claim 19, wherein unsealing the capillary tube inlet includes moving the piston from a first position to a third position, and sealing the capillary tube inlet with the elastomeric seal includes moving the piston from the third position to the first position.

22. The method of claim 21, wherein:

moving the piston from the first position to the third position takes a first amount of time;

moving the piston from the third position to the first position takes a second amount of time; and the second amount of time is greater than the first amount of time.

23. The method of claim 21, wherein moving the piston from the first position to the third position includes locating the piston at least partially within the container, and moving the piston from the third position to the first position includes removing the piston from within the container.

24. The method of claim 19, wherein the fill nozzle further includes a cleaning inlet, and the chamber is fluidly connected to the cleaning inlet, the method further comprising receiving a cleaning fluid through the cleaning inlet.

25. The method of claim 19, wherein the fill nozzle further includes a spring, and sealing the capillary tube inlet with the elastomeric seal includes biasing the elastomeric seal into contact with the piston.

* * * * *